(12) United States Patent
Soccard

(10) Patent No.: US 8,252,134 B2
(45) Date of Patent: Aug. 28, 2012

(54) DEVICE FOR MAINTAINING AND DEPOSITING A THERMOPLASTIC COMPOSITE MATERIAL ON A SHAPING TOOL AND METHOD FOR MAKING A COMPOSITE PART

(75) Inventor: Eric Soccard, Blain (FR)

(73) Assignee: European Aeronautic Defence and Space Company-EADS France, Paris (FR)

( * ) Notice: Subject to any disclaimer, the term of this patent is extended or adjusted under 35 U.S.C. 154(b) by 86 days.

(21) Appl. No.: 12/525,343

(22) PCT Filed: Feb. 5, 2008

(86) PCT No.: PCT/EP2008/051410
§ 371 (c)(1),
(2), (4) Date: Jul. 31, 2009

(87) PCT Pub. No.: WO2008/101803
PCT Pub. Date: Aug. 28, 2008

(65) Prior Publication Data
US 2010/0096076 A1    Apr. 22, 2010

(30) Foreign Application Priority Data
Feb. 6, 2007 (FR) .................................. 07 53089

(51) Int. Cl.
*B32B 37/04* (2006.01)
*B32B 37/10* (2006.01)
(52) U.S. Cl. ............... 156/212; 156/285; 156/309.6; 264/257; 264/258

(58) Field of Classification Search ............ 156/285, 156/286, 308.2, 309.6, 196, 212–214; 264/257, 264/258
See application file for complete search history.

(56) References Cited

U.S. PATENT DOCUMENTS

| 4,908,088 A * | 3/1990 | Boyd et al. ............... 156/307.3 |
| 5,074,770 A | 12/1991 | Graefe |
| 5,108,532 A * | 4/1992 | Thein et al. ............... 156/285 |
| 2008/0136060 A1* | 6/2008 | Shpik et al. ............... 264/319 |

FOREIGN PATENT DOCUMENTS

| EP | 0 247 359 A2 | 12/1987 |
| EP | 0 412 346 A2 | 2/1991 |
| GB | 1 190 261 A | 4/1970 |

OTHER PUBLICATIONS

International Search Report for PCT/EP2008/051410.

* cited by examiner

Primary Examiner — Katarzyna Wyrozebski Lee
Assistant Examiner — Scott W Dodds
(74) Attorney, Agent, or Firm — Pearne & Gordon LLP

(57) ABSTRACT

According to the invention, one or more thermoplastic sheets (NdT: "feuilles thermoplastique" in the original) (2) are applied on a flat or curved tool (13), and strips (NdT: "des bande" in the original) of a polymer are applied and pressed onto the sheets (2). They are maintained by suction pumps (8), the orifices (4) of which open into a closed volume or one substantially delimited by a sealing joint (3) and occupied by a draining fabric (7). The heating treatment concomitant to the deposition to harden or consolidate the prepreg softens the sheets (2), distorts them to the curvature of the tool (13) and incorporates them in the structure of the prepreg.
Application to methods of draping parts with composite material.

11 Claims, 2 Drawing Sheets

Figure 1:
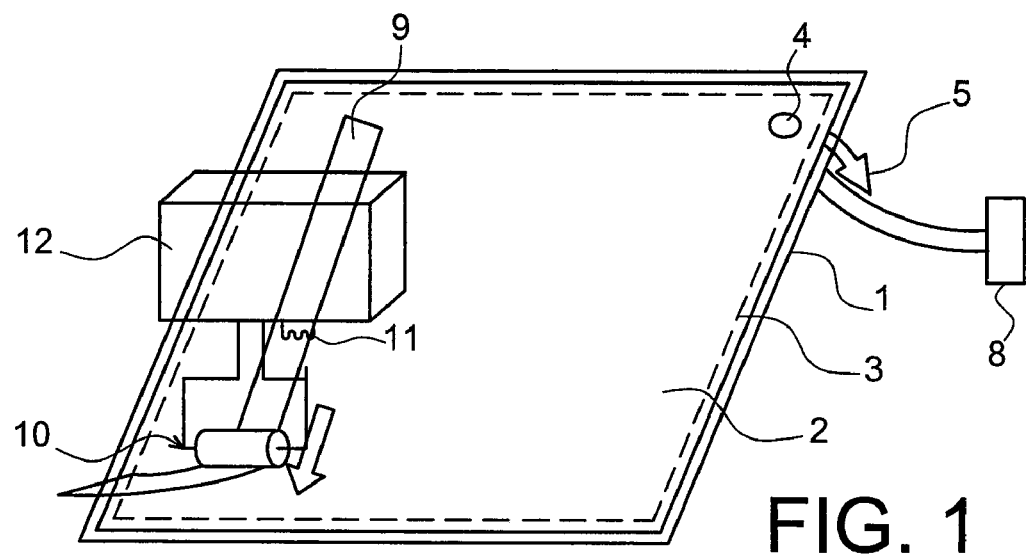

DEVICE FOR MAINTAINING AND DEPOSITING A THERMOPLASTIC COMPOSITE MATERIAL ON A SHAPING TOOL AND METHOD FOR MAKING A COMPOSITE PART

The present invention relates to a device for maintaining and depositing a thermoplastic composite material on a shaping tool.

The object of the invention is the deposition of a first fold of a composite in strip form on a support, known as a flat or curved shaping tool, by an automatic machine.

Composite structures constituted of long fibre reinforcements and a polymer matrix are generally produced with prepreg folds superimposed and draped in adequate directions manually or automatically. They undergo a final transformation cycle known as polymerisation for thermosetting resins and consolidation for thermoplastic resins.

No automatic method exists today for depositing the first fold of the composite. In general, the strips are placed manually one adjacent to the other on an attachment fabric applied on the tool, and the constraining of the assembly is achieved by pumping through suction holes at the surface of the tool. This method meets with difficulties when the part to be constructed, and thus the shaping tool, has a complex non developable surface because the fabric no longer correctly hugs the shape of the tool. The idea of increasing the number of suction holes to improve the layout of the fabric would result in a tool too complicated to construct and to employ.

GB-A-1 190 261 is a prior art that makes it possible to produce panels of composite material having a grainy surface imitating leather. This patent relates to a device for maintaining and depositing at least one sheet of thermoplastic composite material, comprising a tool for shaping the layer, at least one air suction pump and a peripheral sealing joint arranged between the sheet of thermoplastic material and the tool.

The object of this invention is a device for constraining the first fold of a composite, particularly thermoplastic, which can be accomplished in a completely automatic manner. It makes it possible to carry out perfectly the deposition of all of the strips by a fibre placement or draping machine.

In its most general form, it is characterised, compared to said prior art patent, by a layer of draining material applied on the tool, the sheet of thermoplastic material being applied on the layer of draining material, the sealing joint also being arranged around the layer of draining material.

The sheet of thermoplastic material will be integrated in the final structure of the composite by the heating and mechanical attachment produced by the melting that will then be made. Indeed, current machines produce a sufficient input of heat to melt the thermoplastic resin generally present in the prepeg matrix and enable its attachment between the different folds. The same will be true with the thermoplastic sheet that will melt at the bottom of the first fold. And, above all, the softened thermoplastic sheet will adapt itself to the curvature of the tool at all points thanks to the suction. The fold of composite material will then be at the correct curvature. The sheet of thermoplastic material will advantageously be of identical or similar material to that of the resin of the prepreg constituting the composite; it must in all cases be compatible with it so as not to adversely affect the quality of the finished product.

The sheet of polymer also makes it possible to constrain the part being maintained by suction by a small number of holes of the tool.

Another aspect of the invention is a method for creating a part made of composite material using the preceding device, characterised in that it consists, after having deposited the layer of draining material and the thermoplastic sheet on the tool, in depositing the flexible layer of composite material on the sheet of thermoplastic material, and heating the flexible layer of composite material so as to produce a softening of the sheet of thermoplastic material and a close bond between the material of the sheet of thermoplastic material and the flexible layer of composite material.

The invention will now be described with reference to the figures, in which

Figure 2:
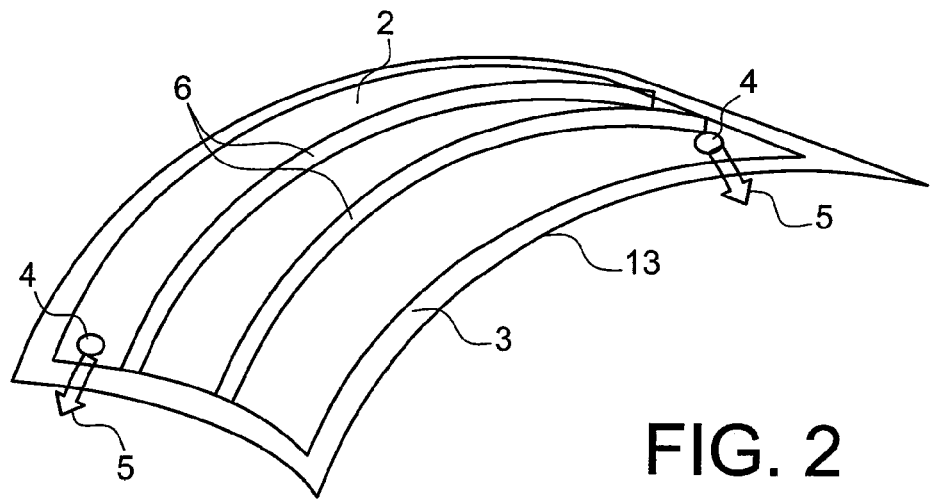

FIG. 1 represents one embodiment of the method,

FIG. 2 an embodiment illustrating the device more clearly, and

Figure 3:
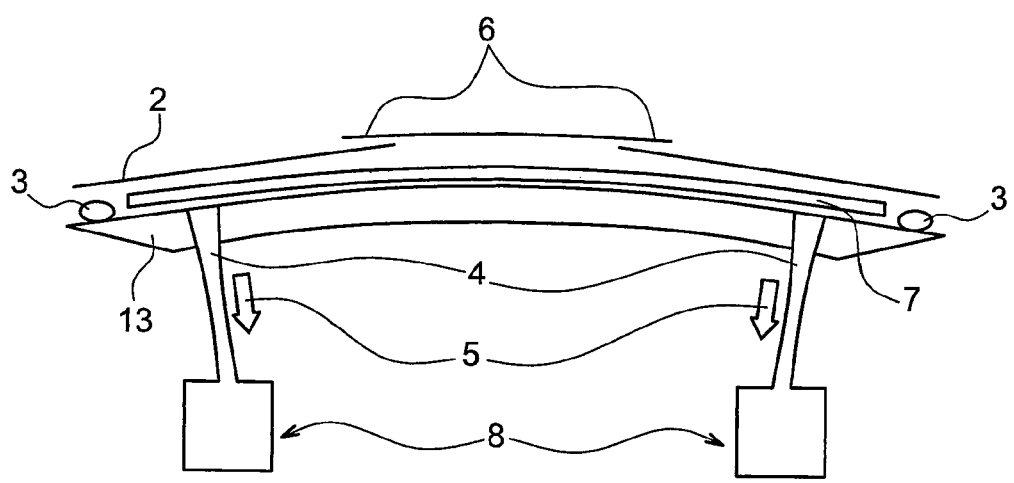

FIG. 3 a section of the embodiment of FIG. 2.

FIG. 1 represents a flat tool 1 and which thus constitutes a simple shape of the invention. A thermoplastic (NdT: "thermostatigue" in the original) sheet 2 is applied on the tool. A sealing joint 3 of mastic is arranged between them at the periphery of the thermoplastic sheet 2. The sealed volume thereby formed is occupied by a draining fabric (7, represented in other figures) and consisting in a fabric or a glass mat. The closed volume has its gas drained by a suction hole 4 pierced through the tool 1 and which communicates with a vacuum pump 8.

A strip 9 of prepreg is applied on the thermoplastic sheet 2 and pressed onto it by an automatic device comprising a pressure roller 10. A heat source 11 accompanying the roller 10 assembled on a same head 12, moveable in relation to the tool 1, completes the consolidation of the strip. The thermoplastic material softens, and the thermoplastic material is integrated in the strip 9 during its final transformation. The following strip 9 may then be deposited next to the previous one. The part is removed from the tool 1 when it has been finished.

FIG. 2 represents a tool 13 having two different curves along its main axes. Maintaining the adherence of the strips is then impossible with ordinary methods, but it remains possible in applying the invention. The single thermoplastic sheet 2 of the preceding embodiment may be replaced by a group of sheets 2, again thermoplastic, each occupying a portion of the surface of the tool 13 and which overlap at overlap portions 6. FIG. 3 shows that the contact between the thermoplastic sheets 2 generally does not exist at these overlapping portions 6 on account of the curvature complexity of the tool 13, but the embodiment of the method is not hindered despite the loss of sealing if the suction is carried out at a higher rate than in the preceding embodiment. The single suction hole 4 of the preceding embodiment may then be replaced by a plurality of suction holes 4, each situated under a different thermoplastic sheet 2 and which can be situated at peripheral portions of the device, not far from the sealing joint 3. A small number of suction holes 4 suffice for a tool even of large surface area. Each of the through holes then advantageously leads to a specific vacuum pump 8.

The method is the same as in the preceding embodiment: the strips 9 of prepreg are deposited one after the other on the thermoplastic sheets 2; the heating softens the thermoplastic sheets 2 and makes them hug the shape of the tool 13 without them forming folds while incorporating them in the constructed part.

The invention claimed is:

1. Method for creating a part made of composite material, comprising the following steps:

depositing a layer of draining material (7) on a shaping tool (1), depositing a sheet (2) of thermoplastic material on the draining material, depositing a flexible layer of the composite material on the thermoplastic sheet, said layer of the composite material being in a prepreg material comprising a resin, heating the flexible layer of composite material so as to produce a softening of the sheet of thermoplastic material and a close bond between the material of the sheet of thermoplastic material and the flexible layer of composite material, air being sucked through the layer of draining material.

2. Method for creating a part made of composite material according to claim 1, wherein air is sucked in draining holes extending through the tool.

3. Method for creating a part made of composite material, comprising the following steps:

depositing a layer of draining material (7) on a shaping tool (1), depositing a sheet (2) of thermoplastic material on the draining material, depositing a flexible layer of the composite material on the thermoplastic sheet, and heating the flexible layer of composite material so as to produce a softening of the sheet of thermoplastic material and a close bond between the material of the sheet of thermoplastic material and the flexible layer of composite material, air being sucked through the layer of draining material, wherein air is sucked in draining holes extending through the tool, and wherein peripheral sealing joint (3) is deposited between the thermoplastic sheet and the tool and around the layer of draining material (7).

4. Method for creating a part made of composite material according to claim 3, wherein the drainage holes are situated at peripheral portions of a device, the device comprising the tool and the peripheral sealing joint (3) which surrounds said holes.

5. Method for creating a part made of composite material according to claim 3, wherein the tool composes two different curvatures along respective main axes.

6. Method for creating a part made of composite material, comprising the following steps:

depositing a layer of draining material (7) on a shaping tool (1), depositing a sheet (2) of thermoplastic material on the draining material, depositing a flexible layer of the composite material on the thermoplastic sheet, heating the flexible layer of composite material so as to produce a softening of the sheet of thermoplastic material and a close bond between the material of the sheet of thermoplastic material and the flexible layer of composite material, air being sucked through the layer of draining material, and depositing a plurality of said sheets of thermoplastic material (2), each covering a separate portion of the tool (1) and overlapping each other at overlapping portions (6).

7. Method for creating a part made of composite material according to claim 6, wherein air is sucked in draining holes extending through the tool.

8. Method for creating a part made of composite material, comprising the following steps:

depositing a layer of draining material (7) on a shaping tool (1), said layer of draining material consisting of either a fabric or a glass mat, depositing a sheet (2) of thermoplastic material on the draining material, depositing a flexible layer of the composite material on the thermoplastic sheet, and heating the flexible layer of composite material so as to produce a softening of the sheet of thermoplastic material and a close bond between the material of the sheet of thermoplastic material and the flexible layer of composite material, air being sucked through the layer of draining material.

9. Method for creating a part made of composite material according to claim 8, wherein air is sucked in draining holes extending through the tool.

10. Method for creating a part made of composite material, comprising the following steps:

depositing a layer of draining material (7) on a shaping tool (1), said layer of draining material consisting of either a fabric or a glass mat, depositing a sheet (2) of thermoplastic material on the draining material, depositing a flexible layer of the composite material on the thermoplastic sheet, said layer of the composite material being in a prepreg material comprising a resin, and heating the flexible layer of composite material so as to produce a softening of the sheet of thermoplastic material and a close bond between the material of the sheet of thermoplastic material and the flexible layer of composite material, air being sucked through the layer of draining material.

11. Method for creating a part made of composite material according to claim 10, wherein air is sucked in draining holes extending through the tool.

* * * * *